UNITED STATES PATENT OFFICE.

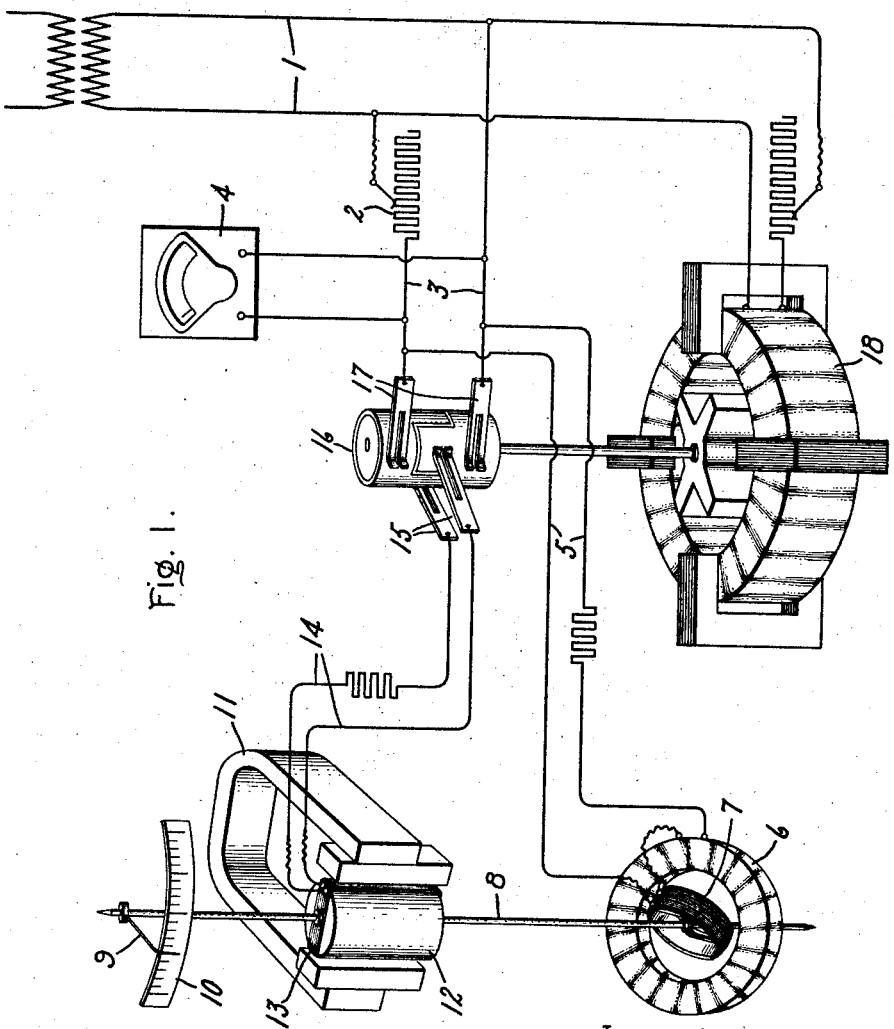

LEWIS T. ROBINSON, OF SCHENECTADY, NEW YORK, AND OTTO HOLZ, DECEASED, BY MATIE D. HOLZ, EXECUTRIX, OF SCHENECTADY, NEW YORK, ASSIGNORS TO GENERAL ELECTRIC COMPANY, A CORPORATION OF NEW YORK.

ELECTRICAL MEASURING INSTRUMENT.

1,057,276. Specification of Letters Patent. Patented Mar. 25, 1913.

Application filed June 9, 1909. Serial No. 501,210.

*To all whom it may concern:*

Be it known that I, LEWIS T. ROBINSON, a citizen of the United States, residing at Schenectady, county of Schenectady, State of New York, did jointly with OTTO HOLZ, deceased, invent the certain new and useful Improvements in Electrical Measuring Instruments set forth in the following specification; and be it also known that I, MATIE D. HOLZ, a citizen of the United States, residing at Schenectady, county of Schenectady, State of New York, executrix of the estate of OTTO HOLZ, deceased, late a citizen of the United States, am informed and believe that the said OTTO HOLZ did jointly with LEWIS T. ROBINSON invent the certain new and useful Improvements in Electrical Measuring Instruments set forth in the following specification.

This invention relates to electrical measuring instruments, and more particularly to instruments for indicating the ratio between the effective voltage and average voltage of an alternating current circuit, this ratio commonly being known as the form factor of the wave of current.

One of the most important tests in connection with the manufacture and use of transformers is the determination of the core loss, but since this loss varies through wide limits when the same transformer is used on circuits having different wave shapes, it is desirable to determine what the core loss of a transformer will be when supplied with current of a given wave shape. For various reasons the sine wave is most desirable for general use and is the wave produced by most modern generators, and it is, therefore, convenient to use the core loss occurring on a sine wave as a standard of comparison, but the transformers must often be tested or used with current having a different wave shape. The core loss in a transformer consists of two components, one due to hysteresis and the other due to eddy currents of the iron of the transformer, and both of these components are affected by a change in wave shape. It has been found that the core loss in a transformer is dependent upon the form factor of the wave, or, in other words, the ratio of the effective electromotive force to the average electromotive force. It has been found by test and calculation that if the core loss due to a current $a$ having a definite wave form be determined, then the core loss due to another current $b$ having a different wave form is equal to the core loss produced by $a$ multiplied by a fraction formed by the form factor of $a$ over the form factor of $b$, this fraction being raised to the 1.6 power; therefore, observations taken on any transformer by means of a wave of one shape may be corrected to apply to the same transformer when excited by current having a different wave shape, and the results which will be obtained by any wave shape may be accurately predicted.

In order to carry out the comparison of the core loss due to current of one wave shape with the loss produced by a different wave shape, the form factors of both waves must be known, and the object of this invention is to produce a simple and accurate instrument which will indicate directly the form factor of the current wave of any alternating current circuit to which it may be applied, and by means of which the data for making the comparisons above described may be quickly and easily secured.

In carrying out this invention, the form factor is determined by causing the indication of the instrument to be the resultant of the effective electromotive force and of the average electromotive force; effective electromotive force in this specification meaning the square root of the mean square value or the value indicated by an alternating current voltmeter.

The invention is preferably embodied in some form of instrument having an indicating element which is free to move without restraint and having means which tend to move the indicating element in one direction to an extent dependent on the effective voltage, and means which tend to move the indicating element in the other direction to an extent dependent on the average voltage, both of said means tending to move said element through an equal range of movement. The preferred form of instrument comprises essentially an alternating current voltmeter, which indicates the effective value of the electromotive force and tends to turn a pivoted indicator in one direction through a definite range, such as 90°, while another device, which indicates the average electromotive force acts upon the same indicator and tends to turn it in the opposite direction through the same range of 90°. The preferred form of device for indicating the average voltage comprises a voltmeter which responds to unidirectional potential, this potential being dependent upon the potential of the alternating current circuit of which the wave shape is to be investigated, and being derived from that circuit by some suitable rectifying device, such as a rectifying commutator driven by a synchronous motor.

This invention will best be understood in connection with the accompanying drawings, which illustrate one of the numerous forms in which it may be embodied and in which—

Figure 1 illustrates diagrammatically one form of device in which the invention may be embodied, and Fig. 2 illustrates a modified form.

In the particular arrangement shown in Fig. 1, the main leads 1 of the alternating current circuit, of which the form factor is to be determined, are connected through a regulating resistance 2 to supply leads 3 on which the voltage may be adjusted to any desired value by means of the regulating resistance 2 and read by means of a voltmeter 4. The effective value of the alternating electromotive force on the supply leads 3 acts upon any suitable device, such as an alternating current voltmeter 6 provided with a moving coil 7 mounted on a freely movable indicating shaft or member 8 provided with an index or pointer 9, which swings over a suitable graduated scale 10. The shaft or movable member 8 is preferably pivoted and is free to turn into any angular position without being restrained by a control spring, and hence is free to take up any position of equilibrium.

In order to obtain the form factor or ratio between the effective value and the average value of the alternating electromotive force on the supply leads 3, suitable means are provided for subjecting the indicator shaft or movable member 8 to a counter-torque opposed to that exerted by the alternating current voltmeter 6 and directly dependent upon the average voltage of the electro-motive force on the leads 3. Various devices may be used for exerting the opposing or counter-torque dependent upon the average voltage, the preferred device being, as shown in Fig. 1, a undirectional voltmeter comprising a permanent magnet 11 for producing a constant magnetic flux through the air gas between the pole pieces of the magnet and an iron core 12, and a current-carrying coil 13 mounted on and rigidly connected to the indicating shaft or member 8 to oppose the action of the alternating current voltmeter 6. The torque exerted by the coil 13 is made dependent upon the average voltage on the supply leads 3 by means of a suitable connections, such as leads 14 which join the coil 13 to the brushes 15 of a rectifying commutator 16, to which current is supplied from the alternating current circuit by means of brushes 17, the commutator being driven at the proper rate by a synchronous motor 18 connected to the main leads 1. It is obvious that any suitable form of rectifying device may be used to supply current to coil 13, and the rectifying commutator driven by the synchronous motor is shown merely for the purpose of illustration. Since the instruments respond to voltage, the coils are preferably high resistance coils, although the amount of current through them can be controlled by the use of suitable resistance in series.

The operation of the form of instrument shown in Fig. 1 is as follows: The instrument is connected to the main leads 1 when the form factor of the current wave on those leads is to be determined, and by means of the adjusting resistance 2 the voltage on the leads 3 is brought to the desired point. The alternating current voltmeter 6 now tends to turn the indicating shaft 8 and pointer 9 into a position dependent upon the effective voltage upon the supply leads 3, while the rectified current supplied from the leads 3 to the coil 13 of the unidirectional voltmeter causes the coil 13 to tend to turn the indicating shaft in the opposite direction into a position dependent upon the average voltage. The result of those opposing forces is that the indicating shaft 8 and the indicator 9 take up a position which is a resultant of both the effective voltage and the average voltage of the alternating electromotive force on the supply leads 3, and this position gives the form factor of the alternating electromotive force which is being investigated. If the form factor of the wave on the main leads 1 is secured in this manner, the core losses of transformers connected with this circuit may be easily calculated if their core losses on a wave of different shape have been secured.

Under some conditions it is desirable to simplify the instrument, and for this purpose the modified form shown in Fig. 2 may be used, in which, as above, the main leads 1 are connected through an adjusting resistance 2 to an alternating current voltmeter 6, which tends to turn the indicating shaft 8 in one direction into a position dependent upon the effective voltage, while at the same time a counter-torque is exerted upon the shaft 8 by means of a device which exerts a torque dependent on the average voltage, this device comprising an iron vane 19, which is of such small section that it is practically saturated and which coöperates with coils 20 connected in series across the main leads 1. By properly proportioning the vane 19, the torque exerted by it on the indicating shaft 8 in opposition to the torque of the alternating current voltmeter 6 may be made practically proportional to the average voltage of the alternating electromotive force on the main leads 1.

By proper calibration the instrument may show directly on its scale core loss in terms of the loss due to any selected wave, since the losses vary in proportion to the 1.6 power of the form factor, and by raising the angle represented by a given form factor to the 1.6 power and marking the resulting angle on the scale suitable calibration may be obtained to give the loss directly.

This invention may be embodied in many other forms than that shown and described herein, and we, therefore, do not wish to restrict ourselves to the arrangement herein disclosed, but aim in the appended claims to cover all modifications within the spirit and scope of the above described invention.

What we claim as new and desire to secure by Letters Patent of the United States, is—

1. A form factor indicator for alternating current circuits, comprising in combination two relatively movable members, and means for producing on the movable member a torque dependent on the average voltage of the circuit and a counter-torque dependent on the effective voltage of the circuit.

2. In a form factor indicator for alternating current circuits, the combination with an unbiased pivoted indicating member, of means for deriving from an alternating current circuit a torque which is exerted on said member to rotate it in one direction and is dependent on the average voltage of the circuit, and means for deriving from the same alternating current circuit a torque which is exerted on said member to rotate it in the opposite direction and is dependent on the effective voltage of the circuit.

3. In a form factor indicator for alternating current circuits, the combination with a voltmeter responsive to the effective voltage of an alternating current circuit of a second voltmeter responsive to the average voltage of an alternating current circuit, an indicating shaft common to both said voltmeters and mounted for unrestrained movement into any angular position, and means for connecting both said voltmeters to an alternating current circuit to exert opposing torques on said indicating shaft.

4. A form factor indicator for alternating current circuits comprising two current-carrying coils, an indicating member carrying said coils and mounted to turn freely into any angular position, means for producing a magnetic flux through both said coils, and means for connecting said coils to an alternating current circuit to cause said coils to exert on said member opposing torques, one dependent on the effective voltage and the other dependent on the average voltage of the alternating current circuit.

5. In a form factor indicator for alternating current circuits, the combination with an alternating current voltmeter, of a unidirectional current voltmeter, an unbiased pivoted indicating member actuated by both voltmeters, a rectifying device connected to said unidirectional voltmeter, and means for connecting said rectifying device and said alternating current voltmeter to an alternating current circuit to cause said voltmeters to exert opposing torques on said indicating member.

In witness whereof, we have hereunto set our hands this 8th day of June, 1909.

LEWIS T. ROBINSON.
MATIE D. HOLZ,
*Executrix of the estate of Otto Holz, deceased.*
Witnesses:
BENJAMIN B. HULL,
ANNA H. WAGNER.

---

Copies of this patent may be obtained for five cents each, by addressing the "Commissioner of Patents, Washington, D. C."